US012741547B2

(12) United States Patent
Sekiguchi et al.

(10) Patent No.: US 12,741,547 B2
(45) Date of Patent: Sep. 22, 2026

(54) CONTROL SYSTEM FOR ELECTRIC VEHICLE

(71) Applicant: TOYOTA JIDOSHA KABUSHIKI KAISHA, Toyota (JP)

(72) Inventors: Yoshito Sekiguchi, Kariya (JP); Atsushi Tabata, Okazaki (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 18/767,262

(22) Filed: Jul. 9, 2024

(65) Prior Publication Data

US 2025/0018806 A1 Jan. 16, 2025

(30) Foreign Application Priority Data

Jul. 12, 2023 (JP) ................................ 2023-114732

(51) Int. Cl.
*B60L 15/00* (2006.01)
*B60L 15/20* (2006.01)

(52) U.S. Cl.
CPC ........... *B60L 15/20* (2013.01); *B60L 2240/12* (2013.01); *B60L 2240/421* (2013.01); *B60L 2240/423* (2013.01)

(58) Field of Classification Search
CPC ................. B60L 15/20; B60L 2240/12; B60L 2240/421; F16H 2306/14; F16H 61/16; F16H 61/0213
See application file for complete search history.

(56) References Cited

U.S. PATENT DOCUMENTS

2015/0274154 A1* 10/2015 Tsuda .................... B60W 20/14 903/945
2021/0229550 A1 7/2021 Isami
2021/0387530 A1* 12/2021 Oh ...................... F16H 61/0213
2022/0001751 A1 1/2022 Umetsu et al.

FOREIGN PATENT DOCUMENTS

DE 102021207654 A1 * 1/2023 ............. B60K 6/547
JP 2010-266045 A 11/2010
JP 2015059635 A * 3/2015
JP 2017043206 A * 3/2017
JP 2019-064328 A 4/2019
JP 2019-106846 A 6/2019
JP 2020-156260 A 9/2020
JP 6787507 B1 11/2020
JP WO2019159978 A1 * 12/2020 ........... F16H 61/686

(Continued)

*Primary Examiner* — Justin S Lee

(74) *Attorney, Agent, or Firm* — Finnegan, Henderson, Farabow, Garrett and Dunner, LLP

(57) ABSTRACT

A control system for an electric vehicle for allowing a driver to virtually enjoy a manual shifting operation as performed in the conventional vehicles having transmissions without reducing stability and operability of the electric vehicle. A controller is configured to set a required drive torque in accordance with a selected operating range, and to selectively allow an execution of a skip shifting of the operating range to the range further than two ranges from the current operating range, based on the required drive torque to be set in the operating range selected by operating a shifting device consecutively.

11 Claims, 8 Drawing Sheets

(56) References Cited

FOREIGN PATENT DOCUMENTS

| | | | | | |
|---|---|---|---|---|---|
| JP | 2021-118569 | A | | 8/2021 | |
| JP | 2022-012205 | A | | 1/2022 | |
| JP | 2022-036844 | A | | 3/2022 | |
| KR | 101592771 | B1 | * | 2/2016 | ............ B60W 50/10 |
| KR | 10-2021-0152059 | A | | 12/2021 | |

* cited by examiner

CONTROL SYSTEM FOR ELECTRIC VEHICLE

CROSS-REFERENCE TO RELATED APPLICATIONS

The present disclosure claims the benefit of Japanese Patent Application No. 2023-114732 filed on Jul. 12, 2023 with the Japanese Patent Office.

BACKGROUND

Field of the Invention

Embodiments of the present disclosure relate to the art of a control system for an electric vehicle in which a motor serves as a prime mover.

Discussion of the Related Art

JP-A-2021-118569 discloses one example of an electric vehicle having a shift device and a clutch device configured to simulate an operation of a manual gear change operation of a vehicle having a manual transmission. In the electric vehicle described in JP-A-2021-118569, as in the vehicle having a manual transmission, the clutch device is operated in conjunction with the shift device by a driver. The electric vehicle described in JP-A-2021-118569 further comprises a torque controller configured to control torque of an electric motor in accordance with an operation of a clutch device. A shift mode is selected by manipulating the shift device from a plurality of modes in which torque characteristics of the electric motor differ in stages with respect to a rotational speed of the electric motor, and the torque controller controls the torque of the electric motor in accordance with the mode selected by the shift device.

JP-A-2020-156260 discloses another example of an electric vehicle configured to provide a driver with a feeling as if driving a vehicle having a manual transmission. The electric vehicle described in JP-A-2020-156260 comprises a motor that propels the electric vehicle; a shift lever that is operated by a driver; a torque map determining a torque value (i.e., a required drive torque or a target drive torque) of the motor; and a control device in which the torque map is installed. According to the teachings of JP-A-2020-156260, the torque map is prepared for each virtual gear stage corresponding to respective shift position. The control device determines a torque value of the motor with reference to the torque map of the virtual gear stage corresponding to the shift position selected by operating the shift lever, and controls the output torque of the motor based on the determined torque value.

JP-A-2022-12205 discloses an electric automobile comprising a paddle switch and a shifter (or a shift lever) electrically connected to an electronic control unit. According to the teachings of JP-A-2022-12205, the electronic control unit is configured to control output torque of a motor with reference to a torque map determining the output torque with respect to a position of an accelerator pedal, and to change the torque map in response to an operation of the paddle switch or the shifter.

The motor employed as a prime mover of the electric vehicles of those kinds is capable of generating a large torque even when launching the electric vehicle or propelling the electric vehicle at a low speed. Therefore, the electric vehicles described in the above-mentioned prior art documents are not provided with a transmission for multiplying the drive torque. Nonetheless, the shifting device and the shift switch similar to the conventional ones are arranged in the electric vehicles described in the above-mentioned prior art documents, and an operating mode or a torque map may be selected from a plurality of modes or maps for controlling the torque in different ways. That is, the electric vehicles described in the above-mentioned prior art documents may be operated as a conventional vehicle having a manual transmission by manually operating the shifting device or shift switch thereby changing the mode or map. Therefore, according to the teachings of JP-A-2021-118569 and JP-A-2020-156260, the driver is allowed to enjoy a manual shifting operation virtually, and to feel the behavior of the conventional vehicle having a manual transmission. Whereas, according to the teachings of JP-A-2022-12205, the driver is allowed to enjoy a sequential shifting virtually by manipulating a paddle switch or a shift lever as the conventional vehicle having a manual transmission.

However, the electric vehicles described in the above-mentioned prior art documents would be destabilized as a result of controlling the output torque of the motor while changing the operating mode or torque map as taught by the above-mentioned prior art documents. For example, in a case of changing the operating mode two times or more or shifting the operating range to the range further than two stages from the current stage to change torque characteristics of the motor within a short period of time, the output torque of the motor would be changed abruptly. Consequently, drive force to propel the electric vehicles described in the above-mentioned prior art documents would be changed abruptly. Especially, if the operating mode is changed two times or more in a direction corresponding to a downshifting of the conventional transmission, the drive force would be increased abruptly thereby causing wheel slip to disturb the behavior of the electric vehicles described in the above-mentioned prior art documents. In order to avoid such abrupt change in the drive force, it may be effective to inhibit consecutive shifting operations to the range or mode further than two modes or stages from the current mode or stage. In this case, however, part of the shifting operations available in the conventional vehicles having transmissions have to be inhibited and hence operability of the electric vehicle has to be reduced.

Thus, the conventional electric vehicles have to be improved to allow drivers to enjoy the manual shifting operation as performed in the conventional vehicles having transmissions without reducing stability and operability of the electric vehicles.

SUMMARY

Aspects of embodiments of the present disclosure have been conceived noting the foregoing technical problems, and it is therefore an object of the present disclosure to provide a control system for an electric vehicle configured to allow a driver to virtually enjoy a manual shifting operation as performed in the conventional vehicles having transmissions without reducing stability and operability of the electric vehicle.

The present disclosure relates to the art of a control system for an electric vehicle that controls a motor serving as a prime mover based on a target torque value set in accordance with a required drive force. According to the exemplary embodiment of the present disclosure, the target torque value is set in accordance with an operating range of the electric vehicle selected from a plurality of ranges in which torque characteristics differ in accordance with a change in a speed of the motor. The control system comprises: a shifting device that is manipulated by a driver to select the operating range from the plurality of ranges; and a controller that controls an output torque of the motor based on the target torque value set in accordance with the operating range selected by operating the shifting device. In order to achieve the above-explained objective, the controller is configured to selectively allow an execution of a skip shifting of the operating range to the range further than two ranges from the current operating range, based on the target torque value to be set in the operating range selected by operating the shifting device consecutively.

In a non-limiting embodiment, the controller may be further configured to selectively allow an execution of the skip shifting when the shifting device is operated consecutively to shift the operating range to the range where the target torque value is increased from a value set in the current operating range.

In a non-limiting embodiment, the controller may be further configured to: allow an execution of the skip shifting in a case that the target torque value to be set in the operating range selected by operating the shifting device consecutively is equal to or less than a threshold torque value; and reject an execution of the skip shifting in a case that the target torque value to be set in the operating range selected by operating the shifting device consecutively is greater than the threshold torque value.

In a non-limiting embodiment, the threshold torque value may vary in accordance with a change in a speed of the electric vehicle or the speed of the motor. In addition, the controller may be further configured to: allow an execution of the skip shifting in a case that the target torque value to be set in the operating range selected by operating the shifting device consecutively is equal to or less than the threshold torque value with respect to the speed of the electric vehicle or the speed of the motor; and reject an execution of the skip shifting in a case that the target torque value to be set in the operating range selected by operating the shifting device consecutively is greater than the threshold torque value with respect to the speed of the electric vehicle or the speed of the motor.

In a non-limiting embodiment, the threshold torque value may increase with a reduction in the speed of the electric vehicle or the speed of the motor.

In a non-limiting embodiment, the controller may be further configured to: allow an execution of the skip shifting in a case that an increase rate of the target torque value to be set in the operating range selected by operating the shifting device consecutively with respect to the current target torque value is equal to or less than a threshold rate; and reject an execution of the skip shifting in a case that the increase rate is greater than the threshold rate.

In a non-limiting embodiment, the threshold rate may vary in accordance with a change in a speed of the electric vehicle or the speed of the motor. In addition, the controller may be further configured to: allow an execution of the skip shifting in a case that the increase rate when the shifting device is operated consecutively is equal to or less than the threshold rate with respect to the speed of the electric vehicle or the motor; and reject an execution of the skip shifting in a case that the increase rate when the shifting device is operated consecutively is greater than the threshold rate with respect to the speed of the electric vehicle or the motor.

In a non-limiting embodiment, the threshold rate increases with a reduction in the speed of the electric vehicle or the speed of the motor.

Thus, the control system according to the exemplary embodiment of the present disclosure is applied to the electric vehicle propelled by at least one motor as a prime mover, and the output torque of the motor is controlled based on the target torque value set in accordance with the required drive force. According to the exemplary embodiment of the present disclosure, the target torque value as a required drive torque is set in the form of a torque map. Specifically, the torque map is prepared for each operating range of the electric vehicle, and each of the torque maps is configured to calculate the required drive torque in different values with respect to a predetermined depression of the accelerator pedal. In the electric vehicle, the operating range is selected by manipulating the shifting device. That is, torque characteristics of the motor is changed by shifting the operating range by the operating shifting device so that the target torque value with respect to a predetermined depression of the accelerator pedal is changed stepwise based on the torque characteristics of the motor selected by the shifting device. For example, the operating range may be shifted from a drive range where the output torque of the motor is controlled in a standard manner, to a range where the motor generates a relatively larger torque at a low speed. Therefore, although the electric vehicle is not provided with a transmission, the driver is allowed to virtually enjoy a manual shifting operation as performed in the conventional vehicle having a transmission.

Specifically, the controller is configured to selectively allow an execution of a skip shifting of the operating range to the range further than two ranges from the current operating range when the shifting device is operated consecutively multiple times within a predetermined short period of time. If such skip shifting is executed, the drive force established by the output torque of the motor will be changed abruptly thereby generating a shock and causing a wheel slip. That is, behavior of the electric vehicle will be disturbed. In order to avoid such disadvantage, according to the exemplary embodiment of the present disclosure, the control system determines a feasibility of the skip shifting when the shifting device is operated consecutively, based on the target torque value to be set in the operating range selected by thus operating the shifting device consecutively. For example, in a case that the target torque value to be set in the operating range selected by operating the downshifting device consecutively is greater than the threshold torque value, or in the case that the increase rate of the target torque value to be increased in the operating range selected by operating the downshifting device consecutively is greater than the threshold torque rate, the behavior of the electric vehicle is expected to be disturbed by the skip shifting to be executed. In those cases, therefore, an execution of the skip shifting is rejected. By contrast, in the case that the target torque value to be set in the operating range selected by operating the downshifting device consecutively is equal to or less than the threshold torque value, or in the case that the increase rate of the target torque value to be increased in the operating range selected by thus operating the downshifting device consecutively is equal to or less than the threshold torque rate, the behavior of the electric vehicle is not expected to be disturbed by the skip shifting to be executed. In those cases, therefore, the skip shifting is allowed to be executed, but the stability and the behavior of the vehicle Ve will not be disturbed by the execution of the skip shifting.

In addition, according to the exemplary embodiment of the present disclosure, the driver is allowed to virtually enjoy a manual shifting operation as performed in the conventional vehicle having a transmission.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
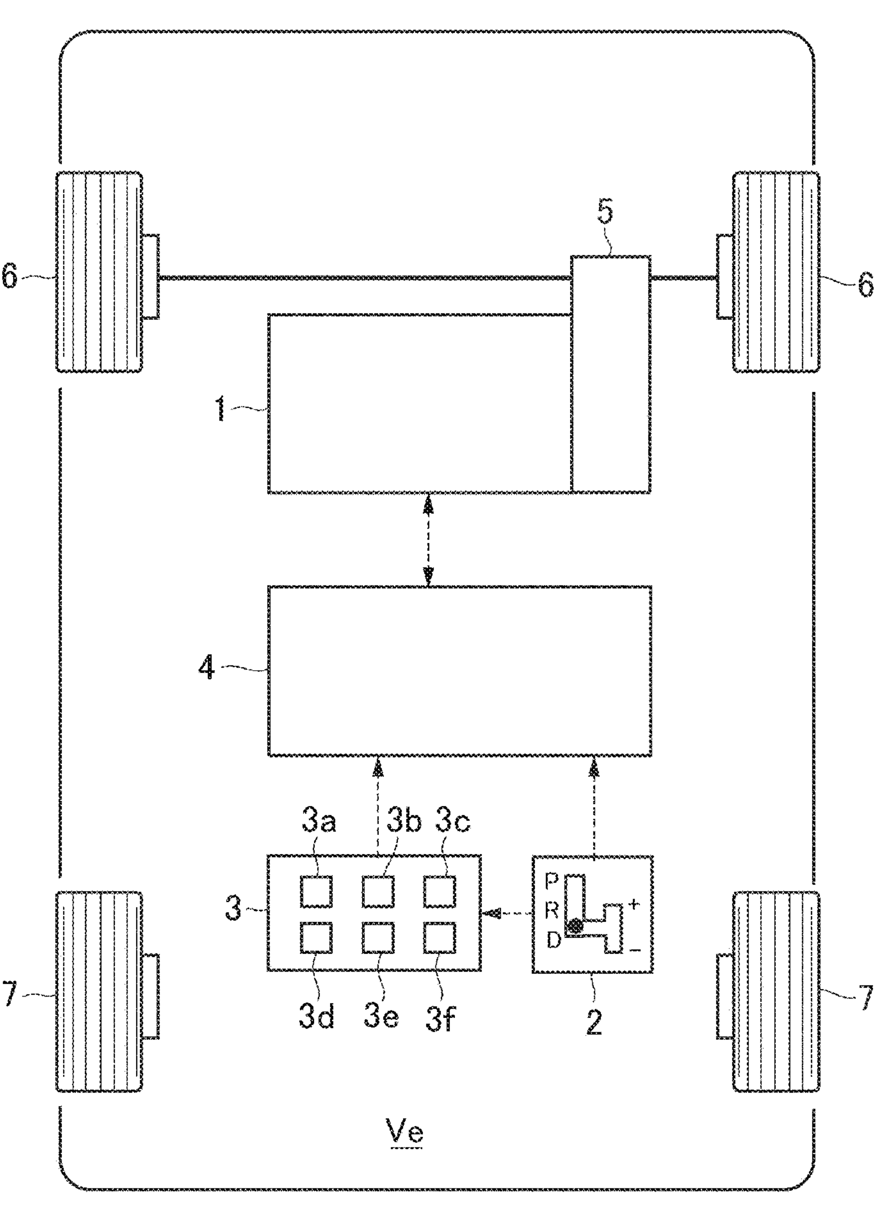
FIG. 1 is a schematic illustration showing a structure of the electric vehicle including a powertrain and a control system.

Referring now to FIG. 1, there is shown one example of a structure of an electric vehicle (hereinafter simply referred to as a vehicle) Ve to which the control system according to the embodiment of the present disclosure is applied. As illustrated in FIG. 1, the vehicle Ve is an electric vehicle comprising a motor 1 as a prime mover, a shifting device 2, a detector 3, and a controller (referred to as ECU in FIG. 1) 4.

Although not shown in FIG. 1, one or more extra motor(s) may be arranged in the vehicle Ve in addition to the motor 1. Instead, the control system according to the embodiment of the present disclosure may also be applied to a hybrid vehicle in which a prime mover includes an engine and a motor. Specifically, the vehicle Ve illustrated in FIG. 1 is a front-wheel-drive layout vehicle in which an output torque of the motor 1 is delivered to a pair of front wheels 6 through a reduction mechanism (not shown) and a differential gear unit 5 to establish drive force to propel the vehicle Ve by the front wheels 6. Otherwise, the control system according to the embodiment of the present disclosure may also be applied to a rear-wheel-drive layout vehicle in which an output torque of the motor 1 is delivered to a pair of rear wheels 7 through a propeller shaft (not shown) to establish drive force to propel the vehicle Ve by the rear wheels 7. In addition, the control system according to the embodiment of the present disclosure may also be applied to a four-wheel-drive layout vehicle in which an output torque of the motor 1 is delivered to both pair of the front wheels 6 and the rear wheels 7 through a transfer to propel the vehicle Ve.

For example, a permanent magnet synchronous motor and an induction motor may be adopted as the motor 1. That is, the motor 1 is a motor-generator that serves not only as a motor to generate torque when driven by electricity suppled thereto, but also as a generator to generate electricity when rotated by a torque applied thereto. In the vehicle Ve, specifically, a battery (not shown) is connected to the motor 1 through an inverter (not shown). Therefore, the motor 1 may be operated as a motor to generate drive torque to propel the vehicle Ve by supplying electricity to the motor 1 from the battery. Instead, the motor 1 may also be operated as a generator to generate electricity by rotating the motor 1 by a torque delivered from the front wheels 6. In this case, the electricity generated by the motor 1 may be accumulated in the battery. A rotational speed and an output torque of the motor 1 is electrically controlled by a controller 4 as an electronic control unit. For example, an output torque of the motor 1 may be controlled based on a required drive torque as a target torque value. Specifically, the required drive torque is set in accordance with a required drive force calculated based on a position of an accelerator pedal (not shown) operated by the driver and a speed of the vehicle Ve. As explained later, according to the exemplary embodiment of the present disclosure, the required drive torque is determined with reference to a torque map selected in accordance with an operating range selected by e.g., the shifting device 2.

Figure 2:
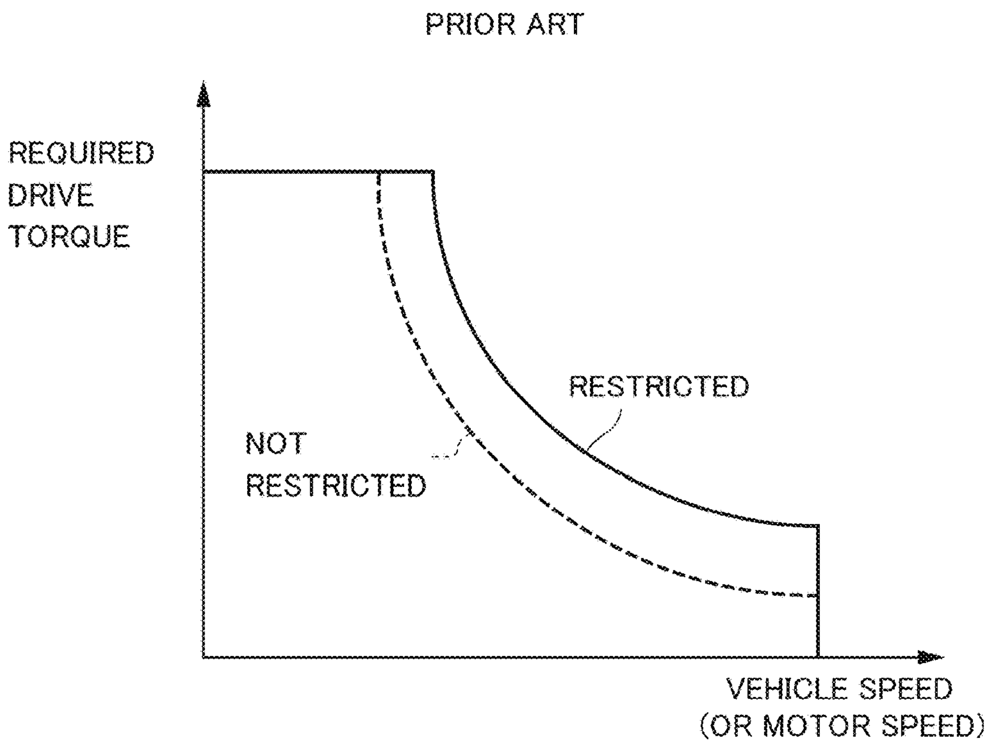
FIG. 2 is a map for determining torque characteristics of a motor employed commonly in electric vehicles.

Turning to FIG. 2, there is shown the torque characteristics of the motor 1. In FIG. 2, specifically, the vertical axis represents a required drive torque, and the horizontal axis represents a speed of the vehicle Ve. The speed of the vehicle Ve may be considered as a rotational speed of the motor 1 taking account of a gear ratio between the motor 1 and the front wheels 6. The solid curve indicates torque characteristics of the motor 1 of a case in which the output torque of the motor 1 is restricted, and the dashed-curve indicates torque characteristics of the motor 1 of a case in which the output torque of the motor 1 is not restricted. For example, the output torque of the motor 1 will be restricted to protect the motor 1 by reducing a load from the motor 1 when a temperature of the motor 1 is higher than an upper limit level or lower than a lower limit level. In addition, a discharge current form the battery will be restricted when a state of charge level of the battery is low and when a temperature of the battery is low, and the output torque of the motor 1 will also be restricted in those cases.

Figure 3:
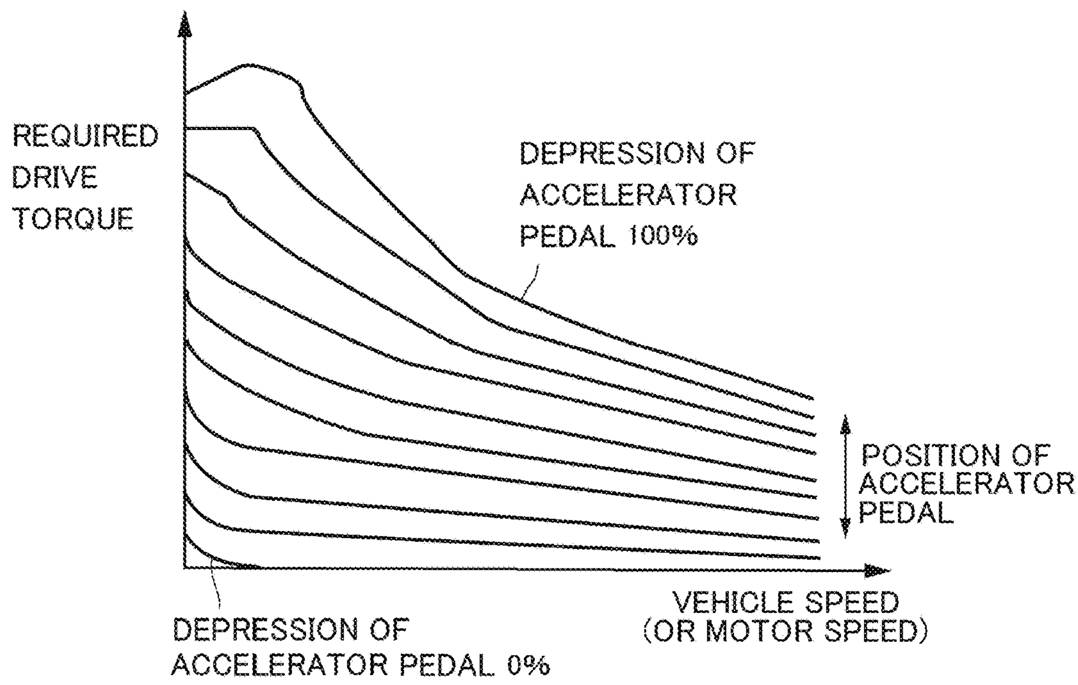
FIG. 3 is a map for determining a required drive torque to be generated by the motor based on a speed of the electric vehicle and a depression of an accelerator pedal.

For example, according to the exemplary embodiment of the present disclosure, the required drive torque as the target torque value of the motor 1 is determined with reference to the torque map shown in FIG. 3. The torque map shown in FIG. 3 is configured to determine the required drive torque to be generated by the motor 1 based on the torque characteristics of the motor 1 shown in FIG. 2, in accordance with the speed of the vehicle Ve corresponding to the speed of the motor 1 and the position (i.e., a depression) of the accelerator pedal. Such torque map shown e.g., in FIG. 3 is prepared for each operating range of the vehicle Ve, and each of the torque maps is configured to calculate the required drive torque in different values with respect to a predetermined depression of the accelerator pedal. As described later, specifically, FIG. 3 shows the torque map for determining the required drive torque to be generated by the motor 1 in a case that a drive range as a normal operating range is selected.

Figure 4:
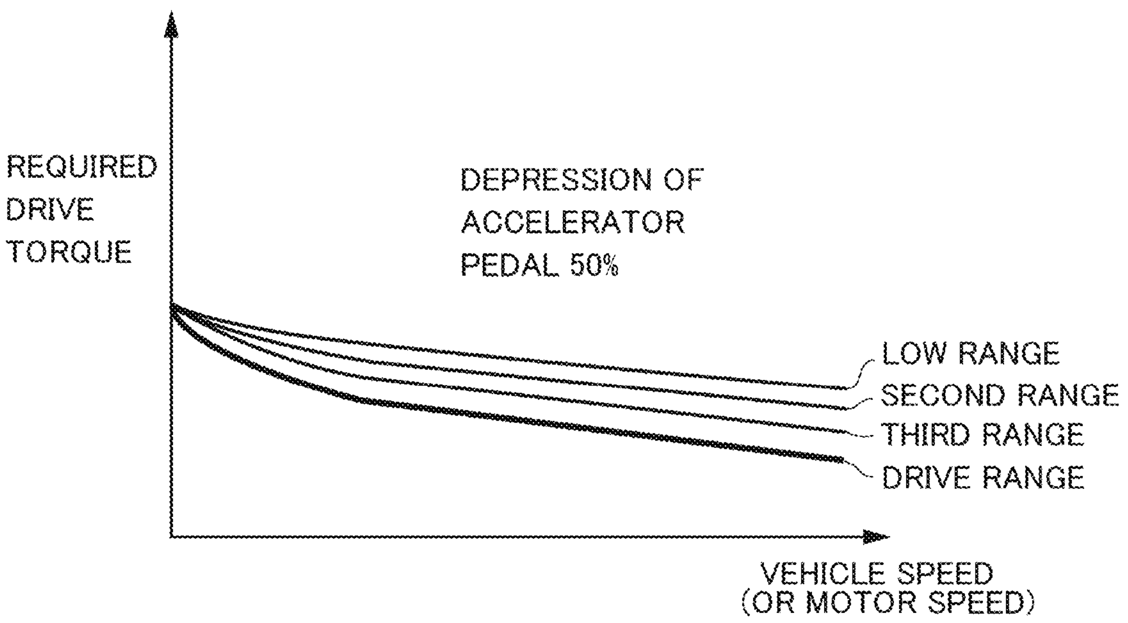
FIG. 4 is a graph indicating the required drive torques in each operating range.

Turning to FIG. 4, there are shown the required drive torques in each of the operating ranges given that a depression of the accelerator pedal is 50%. The required drive torque changes in accordance with the operating range selected from the drive range, a third range, a second range, and a low range (i.e., a first range). As shown in FIG. 4, the required drive torque is set greater in the order of the low range, the second range the third range, and the drive range. For example, the drive range is selected to propel the vehicle Ve in the normal manner, and the required drive torque calculated in the drive range is the standard required drive torque. In a case that the third range is selected, the required drive torque is calculated to be one step greater than the required drive torque calculated in the drive range. Likewise, in a case that the second range is selected, the required drive torque is calculated to be one step greater than the required drive torque calculated in the third range. Also, in a case that the low range is selected, the required drive torque is calculated to be one step greater than the required drive torque calculated in the second range.

Thus, the control system according to the exemplary embodiment of the present disclosure is configured to determine the required drive torque as the target torque value of the output torque of the motor 1 in the currently selected operating range with reference to e.g., the torque map shown in FIG. 3. As described, each of the torque maps is configured to change the torque of the motor 1 in accordance with a position of the accelerator pedal representing a drive force required by the driver, and to determine the required drive torque in accordance with the speed of the vehicle Ve (or the motor 1).

The shifting device 2 is manipulated by the driver to select the operating range of the vehicle Ve, and the torque map is selected in accordance with the operating range selected by operating the shifting device 2. The vehicle Ve to which the control system according to the exemplary embodiment of the present disclosure is not provided with a transmission employed in the conventional vehicles. Accordingly, it is not necessary to operate the transmission in a manual mode by manipulating the shifting device 2. Nonetheless, in order to allow the driver to virtually enjoy a manual shifting operation of the conventional vehicle having the transmission, the vehicle Ve is provided with the shifting device 2, and the above-mentioned torque maps are prepared to imitate the behavior of the conventional vehicle.

Figure 5:
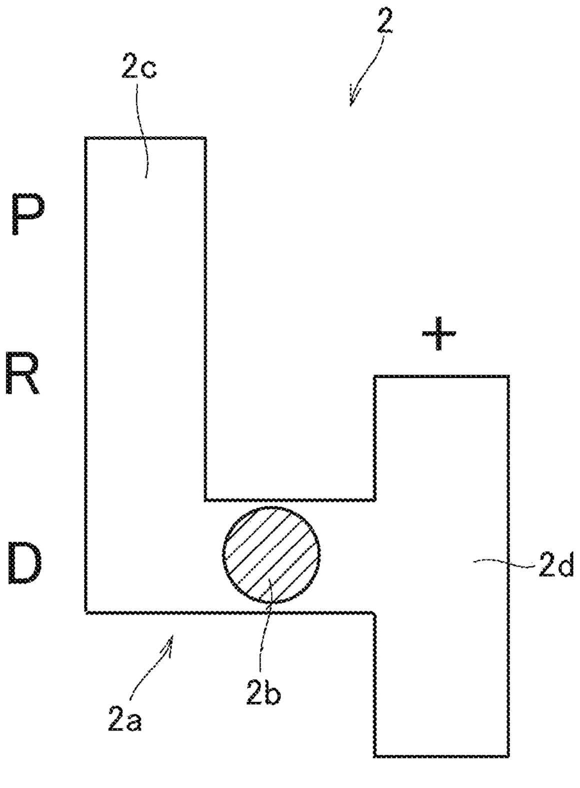
FIG. 5 is a schematic illustration showing a structure of a shifting device having a shift lever and a shift gage.

According to the exemplary embodiment of the present disclosure, a lever shifter 2*a* shown in FIG. 5 is adopted as the shifting device 2. The lever shifter 2*a* is manipulated manually by the driver to select the operating range and an operating mode of the vehicle Ve, and the operating range and the operating mode selected by the shifting device 2 are transmitted to the controller 4 in the form of command signals.

As illustrated in FIG. 5, as a manual shifting device employed in the conventional vehicles having a multiple-stage manual transmission, the lever shifter 2*a* comprises a shift lever 2*b*, and shift gates 2*c* and 2*d*. Specifically, the vehicle Ve is operated in the normal mode in which the vehicle Ve is operated as a normal electric vehicle by placing the shift lever 2*b* within the left gate 2*c*. In this case, the operating range may be selected from the drive range, a reverse range, and a parking range, by moving the shift lever 2*b* to a D-position, a R-position, or a P-position. Whereas, the vehicle Ve is operated in the manual mode by moving the shift lever 2*b* within the right gate 2*d*. In this case, the operating range is shifted to a range one range higher than the current operating range by moving the shift lever 2*b* to a + position (i.e., an upshifting position), and consequently the required drive torque is reduced to a value one step smaller than the prior value. That is, by thus moving the shift lever 2*b* to the + position within the right gate 2*d*, a shifting operation of the operating range is executed in a similar manner as an upshifting of the conventional transmission. By contrast, the operating range is shifted to a range one range lower than the current operating range by moving the shift lever 2*b* to a – position (i.e., a downshifting position), and consequently the required drive torque is increased to a value one step larger than the prior value. That is, by thus moving the shift lever 2*b* to the – position within the right gate 2*d*, a shifting operation of the operating range is executed in a similar manner as a downshifting of the conventional transmission.

Figure 6A:
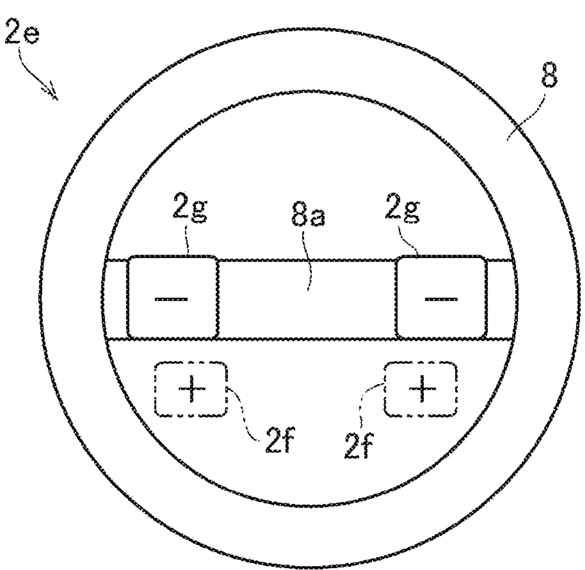
FIG. 6A is a schematic illustration showing a structure of a switch shifter arranged in a steering wheel.
Figure 6B:
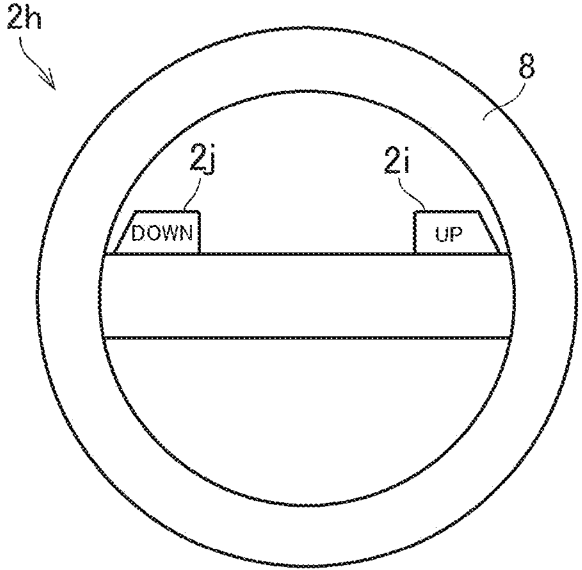
FIG. 6B is a schematic illustration showing a structure of a paddle shifter arranged in a steering wheel.

In the vehicle Ve, a switch shifter 2*e* shown in FIG. 6A or a paddle shifter 2*h* shown in FIG. 6B may be arranged in a steering wheel 8 in addition to the lever shifter 2*a*. As illustrated in FIG. 6A, the switch shifter 2*e* comprises a pair of upshifting switches 2*f* arranged on the front side of a spoke 8*a* of the steering wheel 8, and a pair of downshifting switches 2*g* arranged on the reverse side of the spoke 8*a*. Given that the switch shifter 2*e* is employed, the operating range is also shifted to a range one range higher than the current operating range by pushing any one of the upshifting switches 2*f* irrespective of the operating mode, and consequently the required drive torque is reduced to a value one step smaller than the prior value. That is, a shifting operation of the operating range is also executed in a similar manner as an upshifting of the conventional transmission. By contrast, the operating range is also shifted to a range one range lower than the current operating range by pushing any one of the downshifting switches 2*g* irrespective of the operating mode, and consequently the required drive torque is increased to a value one step larger than the prior value. That is, a shifting operation of the operating range is also executed in a similar manner as a downshifting of the conventional transmission. On the other hand, as illustrated in FIG. 6B, the paddle shifter 2*h* comprises an upshifting paddle 2*i* and a downshifting paddle 2*j* arranged e.g., on the reverse side of the spoke 8*a* of the steering wheel 8. Given that the paddle shifter 2*h* is employed, the operating range is also shifted to a range one range higher than the current operating range by pulling the upshifting paddle 2*i* irrespective of the operating mode, and consequently the required drive torque is reduced to a value one step smaller than the prior value. That is, a shifting operation of the operating range is also executed in a similar manner as an upshifting of the conventional transmission. By contrast, the operating range is also shifted to a range one range lower than the current operating range by pulling the downshifting paddle 2*j* irrespective of the operating mode, and consequently the required drive torque is increased to a value one step larger than the prior value. That is, a shifting operation of the operating range is also executed in a similar manner as a downshifting of the conventional transmission. Here, it is to be noted that such upshifting and downshifting to be caused by operating the switch shifter 2*e* or the paddle shifter 2*h* may be inhibited by operating a dedicated inhibiting device such as a button or switch. In addition, the right gate 2*d* may be omitted according to need if the switch shifter 2*e* or the paddle shifter 2*h* is arranged in the steering wheel 8.

Figure 7:
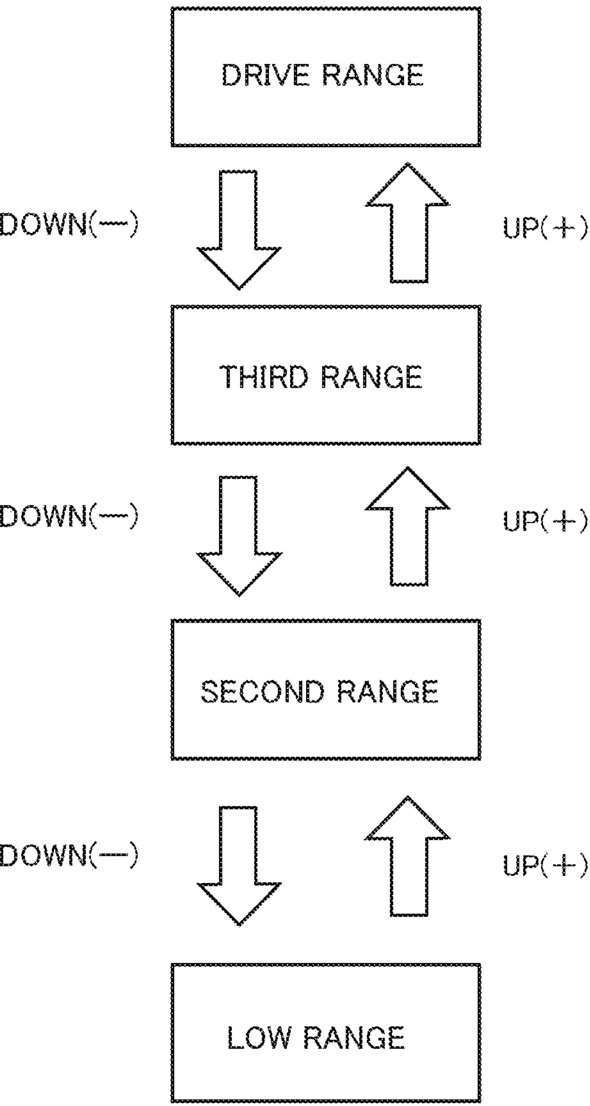
FIG. 7 is a block diagram showing the procedure of a shifting operation of the operating range executed by manipulating the shifting device.

Procedure of the shifting operation of the operating range by manipulating any one of the lever shifter 2*a*, the switch shifter 2*e*, and the paddle shifter 2*h* is schematically shown in FIG. 7. As shown in FIG. 7, the procedure of the shifting operation of the operating range is similar to that of a sequential shifting of the conventional multiple-stage automatic transmission in the manual mode. Here will be explained an example of the shifting operation by manipulating the lever shifter 2*a*. In this case, given that the shift lever 2*b* is positioned at the D-position, the vehicle Ve is operated in the normal mode and in the drive range. In this situation, the operating mode is shifted to the manual mode by moving the shift lever 2*b* from the D-position into the right gate 2*d*, and the operating range is shifted to the third range by moving the shift lever 2*b* to the – position in the right gate 2*d*. Consequently, the required drive torque is increased to a value one step larger than the value previously set in the drive range. The operating range is further shifted to the second range by moving the shift lever 2*b* to the – position in the right gate 2*d* again (i.e., two times), and consequently the required drive torque is increased two steps greater than the value previously set in the drive range. Likewise, the operating range is further shifted to the low range by moving the shift lever 2*b* to the – position in the right gate 2*d* again (i.e., three times), and consequently the required drive torque is increased three steps greater than the value previously set in the drive range. That is, a so-called "skip shifting" is executed to shift the operating range downwardly to the range further than two ranges from the current operating range by thus moving the shift lever 2*b* multiple times in the same direction toward the – position. By contrast, given that the vehicle Ve is operated in the low range, the operating range is shifted to the second range by moving the shift lever 2*b* to the + position in the right gate 2*d*, and consequently the required drive torque is reduced one step smaller than the value previously set in the low range. The operating range is further shifted to the third range by moving the shift lever 2*b* to the + position in the right gate 2*d* again (i.e., two times), and consequently the required drive torque is reduced two steps smaller than the value previously set in the low range. Likewise, the operating range is further shifted to the drive range by moving the shift lever 2*b* to the + position in the right gate 2*d* again (i.e., three times), and consequently the required drive torque is reduced three steps smaller than the value previously set in the low range. That is, the skip shifting is executed to shift the operating range upwardly to the range further than two ranges from the current operating range by thus moving the shift lever 2*b* multiple times in the same direction toward the + position. Given that the switch shifter 2*e* is arranged in the steering wheel 8, the operating range is also shifted downwardly stepwise every time the downshifting switch 2*g* is pushed, and also shifted upwardly stepwise every time the upshifting switch 2*f* is pushed. Likewise, given that the paddle shifter 2*h* is arranged in the steering wheel 8, the operating range is also shifted downwardly stepwise every time the downshifting paddle 2*j* is pulled, and also shifted upwardly stepwise every time the upshifting paddle 2*i* is pulled.

In addition, the above-mentioned shift device described in JP-A-2021-118569 may also be adopted as the shifting device 2. As described, the shift device described in JP-A-2021-118569 is adapted to simulate a manual gear change operation of a vehicle having a manual transmission. For example, in the shifting device of this kind, a shift lever (not shown) is moved along a conventionally known six-speed shift pattern having six forward positions, a neutral position, and a reverse position. In this case, the skip downshifting may also be executed by moving the shift lever from e.g., the sixth position to the fourth position. As an option, as in the conventional vehicle having a manual transmission, an imitation clutch device may be arranged in the vehicle Ve to be operated in conjunction with the shifting device 2.

According to the exemplary embodiment of the present disclosure, the controller 4 is configured to selectively allow an execution of the skip shifting of the operating range to the range further than two ranges from the current operating range when the shifting operation is executed consecutively by manipulating e.g., the shifting device 2, based on the required drive torque to be set in the operating range selected by operating the shifting device sequentially multiple times.

In order to collect data and information required to control the vehicle Ve, the detector 3 comprises a power supply unit, a microcomputer, a sensor, and an input/output interface. For example, the detector 3 collects data relating to operating conditions of the vehicle Ve, the motor 1, and the shifting device 2. To this end, the detector comprises: a vehicle speed sensor 3*a* that detects a speed of the vehicle Ve; an accelerator sensor 3*b* that detects a position (i.e., a depression) of the accelerator pedal; a shift position sensor 3*c* that detects a position of the shift lever 2*b* of the shifting device 2; a motor speed sensor (or a resolver) 3*d* that detects a rotational speed of the motor 1; an SOC sensor 3*e* that detects a state of charge level of a battery (not shown); and a temperature sensor 3*f* that detects a temperature of the battery. The detector 3 is electrically connected to the controller 4 so that the detection data collected by the above-mentioned sensors is transmitted to the controller 4 in the form of an electric signal.

The controller 4 is an electronic control unit comprising a microcomputer for controlling the vehicle Ve. According to the exemplary embodiment of the present disclosure, specifically, the controller 4 is configured to control an output torque of the motor 1. To this end, various data collected or calculated by the detector 3 is transmitted to the controller 4, and the controller 4 performs calculation using the incident data, data stored in advance, a calculation formula etc. The calculation result is transmitted from the controller 4 in the form of a command signal to control the output torque of the motor 1. Although only one controller 4 is arranged in the vehicle Ve shown in FIG. 1, a plurality of controllers 4 may also be arranged in the vehicle Ve to control different devices individually, or to perform different controls individually.

As described, the control system according to the exemplary embodiment of the present disclosure is configured to allow the driver to virtually enjoy a manual shifting operation as performed in the conventional vehicle having a transmission without reducing stability and operability of the electric vehicle. To this end, the controller 4 executes a routine shown in FIG. 8.

Figure 8:
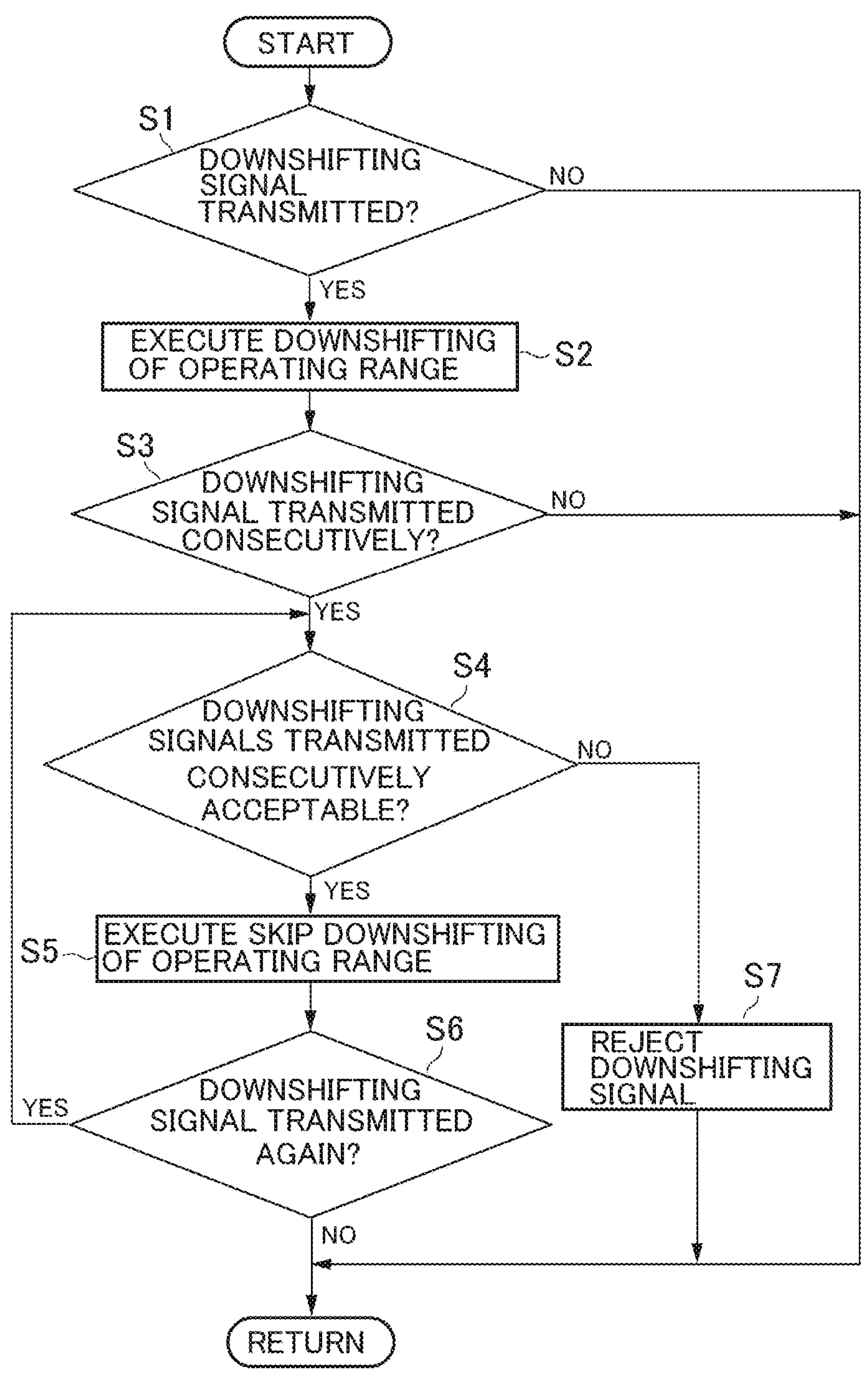
FIG. 8 is a flowchart showing an example of a routine executed by the control system according to the exemplary embodiment of the present disclosure.

As described, the operating mode of the vehicle Ve may be selected from the normal mode and the manual mode by manipulating the shift lever 2*b* of the shifting device 2, and the routine shown in FIG. 8 is executed when e.g., the vehicle Ve is operated in the manual mode. In addition, the routine shown in FIG. 8 may also be executed when the switch shifter 2*e* or the paddle shifter 2*h* is operated consecutively multiple times.

Figure 9:
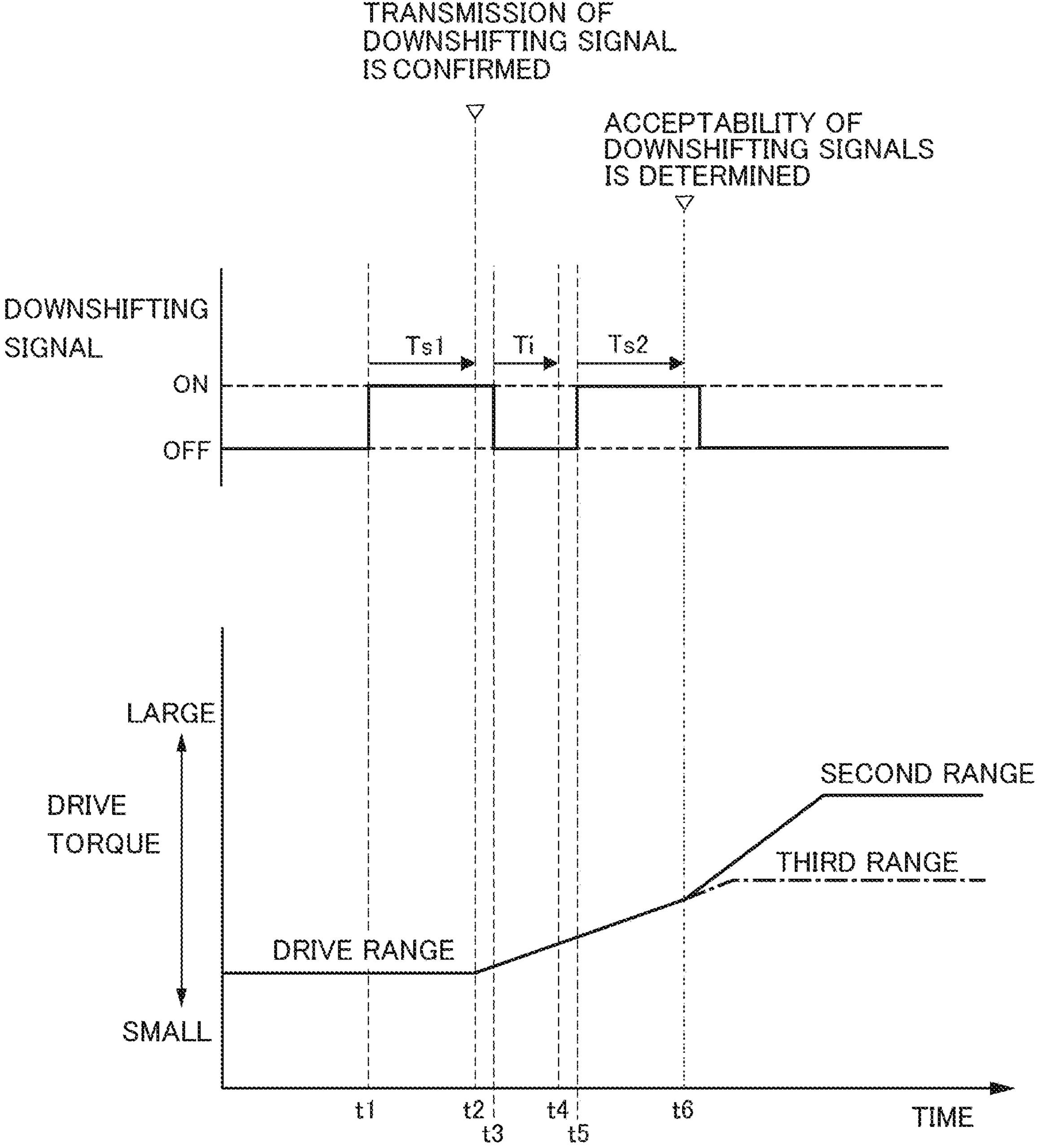
FIG. 9 is a time chart showing one example of downshifting signals transmitted during execution of the routine shown in FIG. 8, and the operating range shifted in response to the transmission of the downshifting signals.

At step S1, it is determined whether a downshifting signal is transmitted from any one of the shifting device 2, the switch shifter 2*e*, and the paddle shifter 2*h* to the controller 4. As described, the downshifting signal is transmitted from the shifting device 2 by moving the shift lever 2*b* to the – position. In addition, the downshifting signal is also transmitted from the switch shifter 2*e* by pushing the downshifting switch 2*g*, or from the paddle shifter 2*h* by pulling the downshifting paddle 2*j*. That is, the downshifting signal is transmitted by turning on a downshifting device including the shift lever 2*b* of the shifting device 2, the upshifting switch 2*f* of the switch shifter 2*e*, and the downshifting paddle 2*j* of the paddle shifter 2*h*. FIG. 9 shows one example of the downshifting signals transmitted during execution of the routine shown in FIG. 8, and the operating range shifted in response to the transmission of the downshifting signals. Specifically, the controller 4 determines a transmission of the downshifting signal if the shift lever 2*b* of the shifting device 2 is positioned at the – position for a first threshold time period Ts1 or longer shown in FIG. 9 between point t1 and point t2. Likewise, the controller 4 determines a transmission of the downshifting signal if the downshifting switch 2*g* of the switch shifter 2*e* is pushed for the first threshold time period Ts1 or longer, or if the downshifting paddle 2*j* of the paddle shifter 2*h* is pulled for the first threshold time period Ts1 or longer. That is, the controller 4 determines a transmission of the downshifting signal if the downshifting device is operated for the first threshold time period Ts1 or longer. Thus, the first threshold time period Ts1 is a reference period set to determine an execution of an operation of the downshifting device.

If the downshifting signal is not transmitted to the controller 4 so that the answer of step S1 is NO, the routine returns.

By contrast, if the downshifting signal is transmitted to the controller 4 so that the answer of step S1 is YES, the routine progresses to step S2 to execute a downshifting of the operating range.

At step S2, specifically, the operating range is shifted from the current operating range to the range one range lower where the required drive torque is increased. In this situation, according to the example shown in FIG. 9, a transmission of the downshifting signal is determined at point t2 so that the downshifting from the drive range to the third range is commenced at point t2.

Then, at step S3, it is determined whether the downshifting device is operated consecutively to further downshift the operating range. In other words, it is determined at step S3 whether the downshifting signal is transmitted consecutively to execute the downshifting of the operating range again. In this situation, according to the example shown in FIG. 9, the downshifting signal is not transmitted for a threshold time interval Ti or longer shown between point t3 and point t4, and hence the controller 4 determines that the downshifting device is turned off completely. Specifically, the controller 4 determines that the downshifting device is turned off completely if the shift lever 2*b* is returned from the – position for the threshold time interval Ti or longer. Likewise, the controller 4 also determines that the downshifting device is turned off completely if the downshifting switch 2*g* or the downshifting paddle 2*j* is released for the threshold time interval Ti or longer. Then, at point t5, the downshifting device is immediately turned on again within a predetermined time period starting from point t4 at which the controller 4 determined that downshifting device was turned off, and the downshifting device is operated for a second threshold time period Ts2 or longer from point t5. As the first threshold time period Ts1, the second threshold time period Ts2 is also a reference period set to determine an execution of an operation of the downshifting device. That is, the controller 4 also determines a transmission of the downshifting signal if the downshifting device is operated for the second threshold time period Ts2 or longer. In this situation, therefore, the controller 4 determines that the downshifting signal is transmitted consecutively. Thus, the controller 4 determines that the downshifting device is operated consecutively in the case that the downshifting device is once turned on and off, and then turned on and off again within the predetermined time period.

In addition, the controller 4 may also be configured to determine that the downshifting device is operated consecutively in a case that the downshifting device is operated continuously for another predetermined time period or longer. In this case, for example, the controller 4 determines that the downshifting device is operated consecutively in a case that the downshifting device is operated continuously for a total length of the first threshold time period Ts1, the threshold time interval Ti, and the second threshold time period Ts2 or longer.

If the downshifting device is not operated consecutively so that the answer of step S3 is NO, the routine returns.

By contrast, if the downshifting device is operated consecutively so that the answer of step S3 is YES, the routine progresses to step S4 to determine whether to accept the downshifting signals transmitted consecutively.

As described, the shift device adapted to simulate a manual gear change operation of a vehicle having a manual transmission may also be employed as the shifting device 2. In this case, for example, the controller 4 determines that the shift device of this kind is operated consecutively in a case that the skip shifting is executed by moving the shift lever from the sixth position to the fourth position. In this case, therefore, the answer of step S3 will also be YES if the skip shifting of the shift device of this kind is executed.

Figure 10:
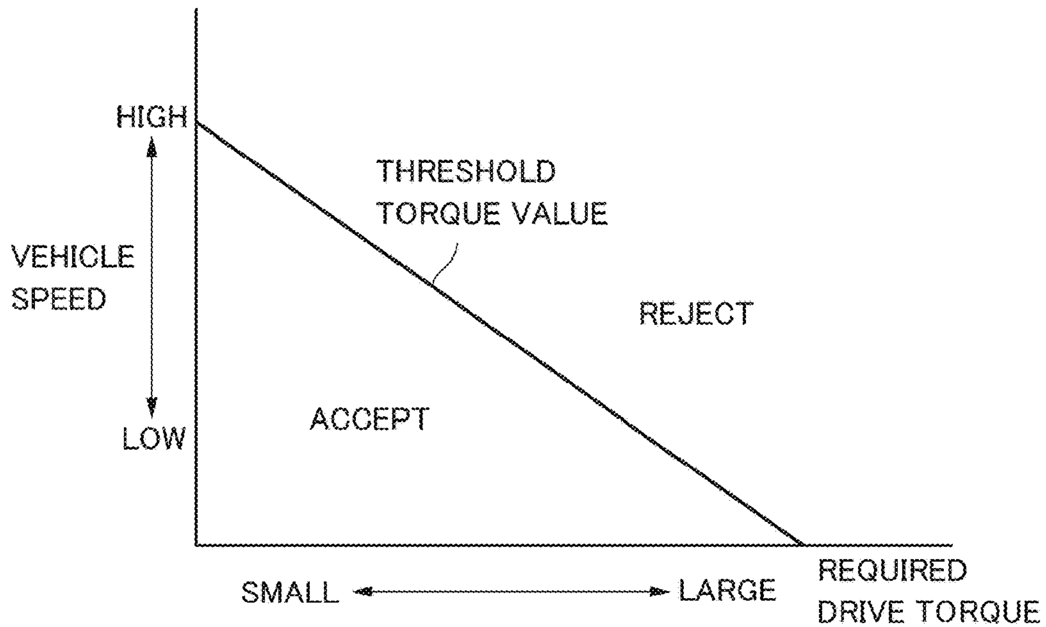
FIG. 10 is a map for determining a threshold torque value employed during execution of the routine shown in FIG. 8.

Specifically, at step S4, it is determined whether to allow an execution of the skip downshifting of the operating range, based on the required drive torque (i.e., the target torque value) to be set in the operating range selected by thus operating the downshifting device consecutively multiple times. In order to selectively allow an execution of the skip downshifting, as shown in FIG. 10, a threshold torque value is set with respect to a speed of the vehicle Ve or the motor 1. In this situation, if the required drive torque to be set in the operating range selected by thus operating the downshifting device consecutively is equal to or less than the threshold torque value, the downshifting signals transmitted consecutively are accepted so that the skip downshifting is executed. By contrast, if the required drive torque to be set in the operating range selected by thus operating the downshifting device consecutively is greater than the threshold torque value, the downshifting signals transmitted consecutively are rejected and hence the skip downshifting will not be executed. That is, the skip downshifting is allowed to be executed if the required drive torque to be set in the operating range selected by operating the downshifting device consecutively falls within an acceptable region shown in FIG. 10.

For example, the threshold torque value is set based on a result of experimental result. Specifically, as can be seen from FIG. 10, the threshold torque value increases with a reduction in the speed of the vehicle Ve. In the vehicle Ve, the speed of the motor 1 serving as a prime mover of the vehicle Ve is changed depending on the speed of the vehicle Ve. Therefore, the threshold torque value may also be varied in accordance with the speed of the motor 1.

Figure 11:
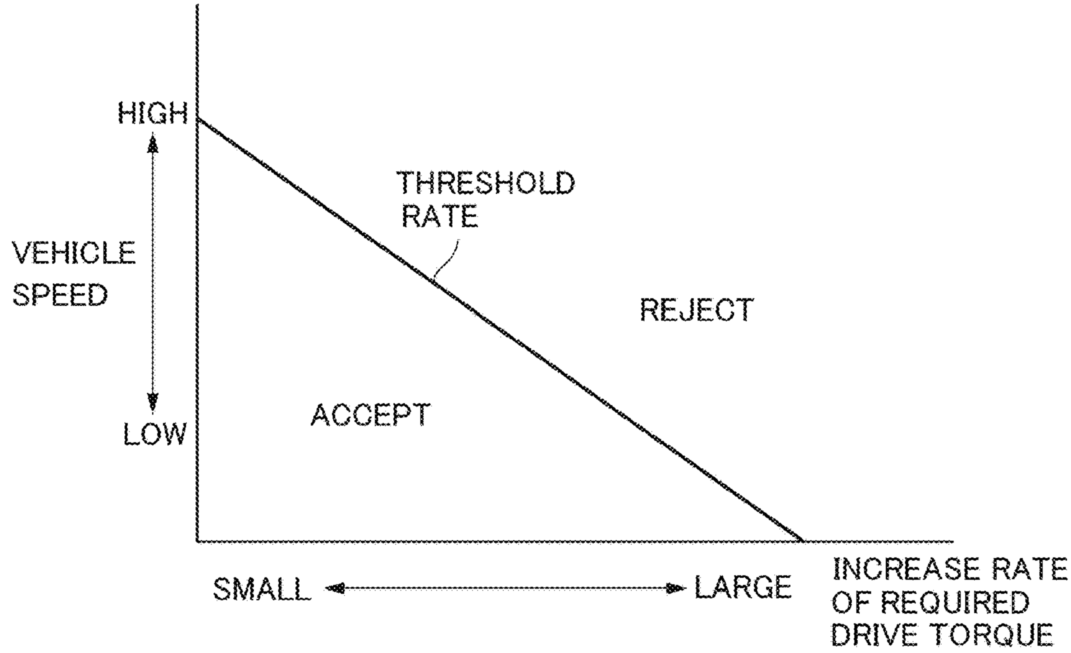
FIG. 11 is a map for determining a threshold rate of an increase rate of the required drive torque employed during execution of the routine shown in FIG. 8.

Instead, a threshold rate of an increase rate of the required drive torque shown in FIG. 11 may also be employed to determine whether to allow an execution of the skip downshifting of the operating range. In this case, if the increase rate of the required drive torque to be increased in the operating range selected by thus operating the downshifting device consecutively is equal to or less than the threshold rate, the downshifting signals transmitted consecutively are accepted so that the skip downshifting is executed. By contrast, if the increase rate of the required drive torque to be increased in the operating range selected by thus operating the downshifting device consecutively is greater than the threshold torque rate, the downshifting signals transmitted consecutively are rejected and hence the skip downshifting will not be executed. That is, the skip downshifting is allowed to be executed if the increase rate of the required drive torque to be increased in the operating range selected by operating the downshifting device consecutively falls within an acceptable region shown in FIG. 11.

For example, the threshold torque rate is also set based on a result of experimental result. Specifically, as can be seen from FIG. 11, the threshold torque rate increases with a reduction in the speed of the vehicle Ve. In the vehicle Ve, the speed of the motor 1 serving as a prime mover of the vehicle Ve is changed depending on the speed of the vehicle Ve. Therefore, the threshold torque rate may also be varied in accordance with the speed of the motor 1.

In addition, the threshold torque value and the threshold torque rate may be changed in accordance with the operating mode of the vehicle Ve. For example, given that a sports mode is available in the vehicle Ve, the threshold torque value and threshold torque rate may be increased to expand the above-mentioned acceptable region during propulsion in the sports mode. That is, in the sports mode, agility of the vehicle Ve is more important rather than stability and comfort of the vehicle Ve. In the sports mode, therefore, the acceptable region is expanded to facilitate an execution of the downshifting when the downshifting device is operated consecutively so that the agility of the vehicle Ve is increased.

If the downshifting signals transmitted consecutively are accepted so that the answer of step S4 is YES, the routine progresses to step S5 to execute the downshifting again.

That is, the skip downshifting is executed at step S5 so that the operating range is shifted to the range further than two ranges from the current operating range. In this situation, according to the example shown in FIG. 9, the downshifting signal transmitted again is accepted at point t6 so that the operating range is further shifted to the second range from point t6 while skipping the third range. Consequently, the required drive torque is increased two steps greater than the value previously set in the drive range.

Then, at step S6, it is determined whether the downshifting signal is transmitted consecutively again to further downshifting the operating range. If the downshifting device is operated again, that is, if the downshifting signal is transmitted again so that the answer of step S6 is YES, the routine returns to step S4 to determine whether to accept the downshifting signal transmitted again.

By contrast, if the downshifting signal is not transmitted again so that the answer of step S6 is NO, the routine returns.

Whereas, if the required drive torque to be increased in the operating range selected by operating the downshifting device consecutively does not fall within the acceptable region shown in FIG. 10 or 11 so that the answer of step S4 is NO, the routine progresses to step S7 to reject the downshifting signal transmitted consecutively.

In this case, according to the example shown in FIG. 9, the downshifting signals transmitted later is rejected at point t6. In this case, therefore, the skip downshifting of the operating range will not be executed. That is, the operating range will not be shifted to the second range, but shifted to the third range. Thereafter, the routine returns.

Thus, according to the exemplary embodiment of the present disclosure, the controller 4 determines the acceptability of the downshifting signals transmitted consecutively when the downshifting device is operated consecutively multiple times. For example, in the case that the required drive torque to be set in the operating range selected by operating the downshifting device consecutively is greater than the threshold torque value, or in the case that the increase rate of the required drive torque to be increased in the operating range selected by thus operating the downshifting device consecutively is greater than the threshold torque rate, the behavior of the vehicle Ve is expected to be disturbed by the skip downshifting to be executed. In those cases, therefore, an execution of the skip downshifting is rejected. By contrast, in the case that the required drive torque to be set in the operating range selected by operating the downshifting device consecutively is equal to or less than the threshold torque value, or in the case that the increase rate of the required drive torque to be increased in the operating range selected by thus operating the downshifting device consecutively is equal to or less than the threshold torque rate, the behavior of the vehicle Ve will not be disturbed by the skip downshifting to be executed. In those cases, therefore, the skip downshifting is allowed to be executed, but the stability and the behavior of the vehicle Ve will not be disturbed by the execution of the skip downshifting.

In addition, according to the exemplary embodiment of the present disclosure, the driver is allowed to virtually enjoy a manual shifting operation as performed in the conventional vehicle having a transmission.

What is claimed is:

1. A control system for an electric vehicle that controls a motor serving as a prime mover based on a target torque value set in accordance with a required drive force, wherein the target torque value is set in accordance with an operating range of the electric vehicle selected from a plurality of ranges in which torque characteristics differ in accordance with a change in a speed of the motor, the control system comprising:

a shifter that is manipulated by a driver to select the operating range from the plurality of ranges; and a controller that controls an output torque of the motor based on the target torque value set in accordance with the operating range selected by operating the shifter, wherein the controller is configured to:

selectively allow an execution of a skip shifting of the operating range to the range further than two ranges from the current operating range, based on the target torque value to be set in the operating range selected by operating the shifter consecutively, allow an execution of the skip shifting in a case that the target torque value to be set in the operating range selected by operating the shifter consecutively is equal to or less than a threshold torque value, and reject an execution of the skip shifting in a case that the target torque value to be set in the operating range selected by operating the shifter consecutively is greater than the threshold torque value.

2. The control system for the electric vehicle as claimed in claim 1, wherein the controller is further configured to selectively allow an execution of the skip shifting when the shifter is operated consecutively to shift the operating range to the range where the target torque value is increased from a value set in the current operating range.

3. The control system for the electric vehicle as claimed in claim 2, wherein the controller is further configured to allow an execution of the skip shifting in a case that the target torque value to be set in the operating range selected by operating the shifter consecutively is equal to or less than a threshold torque value, and reject an execution of the skip shifting in a case that the target torque value to be set in the operating range selected by operating the shifter consecutively is greater than the threshold torque value.

4. The control system for the electric vehicle as claimed in claim 3, wherein the threshold torque value varies in accordance with a change in a speed of the electric vehicle or the speed of the motor, and the controller is further configured to allow an execution of the skip shifting in a case that the target torque value to be set in the operating range selected by operating the shifter consecutively is equal to or less than the threshold torque value with respect to the speed of the electric vehicle or the speed of the motor, and reject an execution of the skip shifting in a case that the target torque value to be set in the operating range selected by operating the shifter consecutively is greater than the threshold torque value with respect to the speed of the electric vehicle or the speed of the motor.

5. The control system for the electric vehicle as claimed in claim 4, wherein the threshold torque value increases with a reduction in the speed of the electric vehicle or the speed of the motor.

6. The control system for the electric vehicle as claimed in claim 2, wherein the controller is further configured to allow an execution of the skip shifting in a case that an increase rate of the target torque value to be set in the operating range selected by operating the shifter consecutively with respect to the current target torque value is equal to or less than a threshold rate, and reject an execution of the skip shifting in a case that the increase rate is greater than the threshold rate.

7. The control system for the electric vehicle as claimed in claim 6, wherein the threshold rate varies in accordance with a change in a speed of the electric vehicle or the speed of the motor, and the controller is further configured to allow an execution of the skip shifting in a case that the increase rate when the shifter is operated consecutively is equal to or less than the threshold rate with respect to the speed of the electric vehicle or the speed of the motor, and reject an execution of the skip shifting in a case that the increase rate when the shifter is operated consecutively is greater than the threshold rate with respect to the speed of the electric vehicle or the motor the speed.

8. The control system for the electric vehicle as claimed in claim 7, wherein the threshold rate increases with a reduction in the speed of the electric vehicle or the motor.

9. A control system for an electric vehicle that controls a motor serving as a prime mover based on a target torque value set in accordance with a required drive force, wherein the target torque value is set in accordance with an operating range of the electric vehicle selected from a plurality of ranges in which torque characteristics differ in accordance with a change in a speed of the motor, the control system comprising:

a shifter that is manipulated by a driver to select the operating range from the plurality of ranges; and a controller that controls an output torque of the motor based on the target torque value set in accordance with the operating range selected by operating the shifter, wherein the controller is configured to:

selectively allow an execution of a skip shifting of the operating range to the range further than two ranges from the current operating range, based on the target torque value to be set in the operating range selected by operating the shifter consecutively, allow an execution of the skip shifting in a case that an increase rate of the target torque value to be set in the operating range selected by operating the shifter consecutively with respect to the current target torque value is equal to or less than a threshold rate, and reject an execution of the skip shifting in a case that the increase rate is greater than the threshold rate.

10. The control system for the electric vehicle as claimed in claim 9, wherein the threshold rate varies in accordance with a change in a speed of the electric vehicle or the speed of the motor, and the controller is further configured to allow an execution of the skip shifting in a case that the increase rate when the shifter is operated consecutively is equal to or less than the threshold rate with respect to the speed of the electric vehicle or the speed of the motor, and reject an execution of the skip shifting in a case that the increase rate when the shifter is operated consecutively is greater than the threshold rate with respect to the speed of the electric vehicle or the speed of the motor.

11. The control system for the electric vehicle as claimed in claim 10, wherein the threshold rate increases with a reduction in the speed of the electric vehicle or the speed of the motor.

* * * * *